Oct. 11, 1960 A. B. CRAWFORD 2,956,277

ELECTROMAGNETIC WAVE TRANSMISSION

Filed Sept. 16, 1957 3 Sheets-Sheet 1

INVENTOR
A. B. CRAWFORD
BY Roy M. Porter Jr.
ATTORNEY

INVENTOR
A. B. CRAWFORD
BY Ray M. Porter Jr.
ATTORNEY

ELECTROMAGNETIC WAVE TRANSMISSION

Filed Sept. 16, 1957 3 Sheets-Sheet 3

INVENTOR
A. B. CRAWFORD
BY Roy M. Porter Jr.
ATTORNEY

United States Patent Office 2,956,277

Patented Oct. 11, 1960

2,956,277

ELECTROMAGNETIC WAVE TRANSMISSION

Arthur B. Crawford, Fairhaven, N.J., assignor to Bell Telephone Laboratories, Incorporated, New York, N.Y., a corporation of New York Filed Sept. 16, 1957, Ser. No. 684,146

8 Claims. (Cl. 343—100)

This invention relates to electromagnetic wave transmission systems and, more particularly, to high frequency transmisison systems employing diversity reception and coupling devices for use therewith.

It was not until comparatively recently that workers in the communications field positively established that propagation of wave signals could be accomplished reliably over distances greater than the line of sight. These "over-the-horizon" or "scatter propagation" systems are now widely accepted. The October 1955 Proceedings of the I.R.E., vol. 43, No. 10 is devoted in its entirety to a complete survey of the principles of scatter propagation.

One recurring problem in the utilization of over-the-horizon propagation systems is fading signal strength at the receiving station. This fading is caused predominantly by variations in the characteristics of the portion of the atmosphere toward which the transmitted signals are directed and from which they are reflected or scattered in a forward direction. Diversity reception has been employed in the communications field to eliminate substantially the undesirable results caused by the fading phenomenon. There are several well-known types of diversity reception. They may be classified as (*a*) frequency diversity, in which the information bearing signals are transmitted and received at two different wavelengths, (*b*) time diversity, in which identical signals are transmitted at two spaced time intervals, (*c*) polarization diversity, in which the transmitted signals are orthogonally polarized, and (*d*) space diversity, in which the receiving station has a plurality of collecting antennas which are physically spaced apart by at least 25 wavelengths of the carrier frequency of the energy being received.

Of the types of diversity above mentioned, each of the first three, while theoretically feasible, has important drawbacks which prevent its wide application as a solution to the fading problem. The majority of scatter propagation diversity systems employs the latter type; namely, space diversity. In the application of space diversity principles to long distance wave transmission, it is necessary to employ at least two antennas physically separated in space. Such an arrangement is costly since duplication of substantially identical antennas is necessary.

There is yet another possible type of diversity reception heretofore unappreciated in the art. For purposes of identification and classification, this new and useful embodiment of the diversity concept is designated "single antenna multiple-lobe diversity." When the term multiple-lobe diversity is used hereinafter it will be understood to refer to a system operable in conjunction with a single antenna or antenna assembly at the receiving terminal. The appropriateness of this designation will become apparent from the system descriptions which follow.

In scatter propagation reception there are two principal types of fading; slow fading and fast fading. Slow fading is descriptive of variation in signal level at the receiver over a period of hours or longer and seems to be associated with macroscopic changes in the average refractive quality of the atmosphere. Fast fading of signal level at the receiver is due to multipath transmission in the atmosphere caused by small variations in the scattering or reflecting portions of the atmosphere hereinabove mentioned. In general, a diversity system has its greatest advantage in overcoming the fast fading of wave energy signals.

It is known in the art that if the physical size of a receiving antenna in a free space, or point-to-point transmission system is doubled, the antenna gain is increased six decibels. It has been observed, however, that if the physical size of the receiving antenna in an over-the-horizon propagation system is doubled, the antenna gain increases an amount less than six decibels. This observed phenomenon may be explained on the basis that the phase front of the wave energy incident on the antenna is not uniform, and, as a result of the cancellation effect of the variously phased components, the resultant wave energy upon arrival is of lesser magnitude than predicted.

As disclosed in the copending application of H. T. Friis, Serial No. 684,026, filed Sept. 16, 1957, it has been observed that the fast fading characteristics of scattered wave energy incident upon different surface areas of a relatively large and highly directive reflecting antenna are substantially uncorrelated. That is, while the received signal strength may be at its minimum value at one point on the antenna surface, it may be at its maximum value at the same instant at a different location on the face of the same antenna or reflector.

It is known that energy reflected for transmission from a large parabolic antenna illuminates a solid angle of the atmosphere. This solid angle is commonly designated an antenna lobe. If a single emitting or radiating means is illuminating the reflector, a single lobe is created. However, a multiplicity of such means concurrently illuminating the reflector will produce a multiplicity of antenna lobes. The relationship among the lobes is determined by the location of the emitting means with respect to the focal point of the reflector in a manner to be described hereinafter. Thus far in the specification, the concept of antenna lobes has been used solely with respect to transmission of wave energy. The lobe concept is equally well applicable to an explanation of the reception of wave energy. Each lobe may be thought of as being associated with a particular energy emitting means situate facing the reflector. This emitting means may function simultaneously as a wave energy absorbing, or collecting means. Thus wave energy in the atmosphere which is intercepted by a given lobe and which is propagating in a direction parallel to the axis of symmetry of the lobe will be incident upon the reflector face and will be directed to the collecting means associated with that particular lobe. It may be appreciated that if the wave energy incident on the face of a highly directive reflector has been found to be uncorrelated, it is likely that the wave energy directed to each of the individual collecting means will likewise be uncorrelated. When these bifunctional means are constructed properly, a relatively wide resultant equiphase transmission beam may be produced at a transmitting station but as a result of the high directivity of the large antenna each absorbing or collecting means, by virtue of its intimate association with a particular wave energy lobe, will be "looking at" a different section of the troposphere and thus will be receiving a wave signal whose fast fading characteristics differ from the others in a random manner.

The bifunctional means referred to above and classified as radiating and emitting means are the terminal apertures of a multiple channel feed device. In order that the principles of single antenna multiple lobe diversity be realized, provision must be made for a wave energy coupling device capable of operation between the feed device apertures, a transmitter, and a diversity receiver. It is toward this aspect of a multiple lobe diversity system that the present invention is directed.

In the operation of a two-terminal scatter propagation system employing the principles of multiple lobe diversity, two coupling devices, one at each station, are needed. In order to minimize the problem of intermodulation or crosstalk at a given terminal, the transmitted and received wave energy may be polarized orthogonally. In order that the coupling device be capable of carrying out its function, namely; to channel correlated wave energy traveling in one direction from a transmitter into one or more of a plurality of substantially identical wave paths in a manner providing an equiphase front energy beam at the open terminal ends thereof while at the same time to channel a plurality of uncorrelated wave energy signals traveling in the opposite direction into the same plurality of substantially identical wave paths and to couple these uncorrelated signals from said wave paths into separate paths connected in parallel fashion to a diversity receiver, it is necessary that the coupler be at least polarization selective. Various structures capable of fulfilling the above function may be assembled from prior art devices; from polarization selective directional couplers, for example. A major drawback associated with the majority of coupling devices produced from an aggregation of prior art elements is the geometrical or physical dissimilarity of the coupling devices at each of the two terminals. Since the couplers are dissimilar, they are not interchangeable among the terminal stations of the propagation system. Addition-wave energy at every terminal are rigidly determined by ally, the polarizations of the transmitted and received the coupler.

It is therefore an object of this invention to couple wave energy in a polarization selective manner at a terminal station of a multiple lobe diversity scatter propagation system.

It is a further object of this invention to couple wave energy in identical structures at all terminal stations of a multiple lobe diversity system.

A feature of the invention is the complete interchangeability of the basic coupling structures among terminals of the scatter propagation system.

A further feature of the invention is its inherent adaptability to interchanged orthogonal polarizations between the transmitted and received wave energy at a given terminal.

These and other objects and features of the present invention, its nature, and its various advantages, will appear more fully upon consideration of the accompanying drawings and the detailed description thereof which follow.

Figure 1:
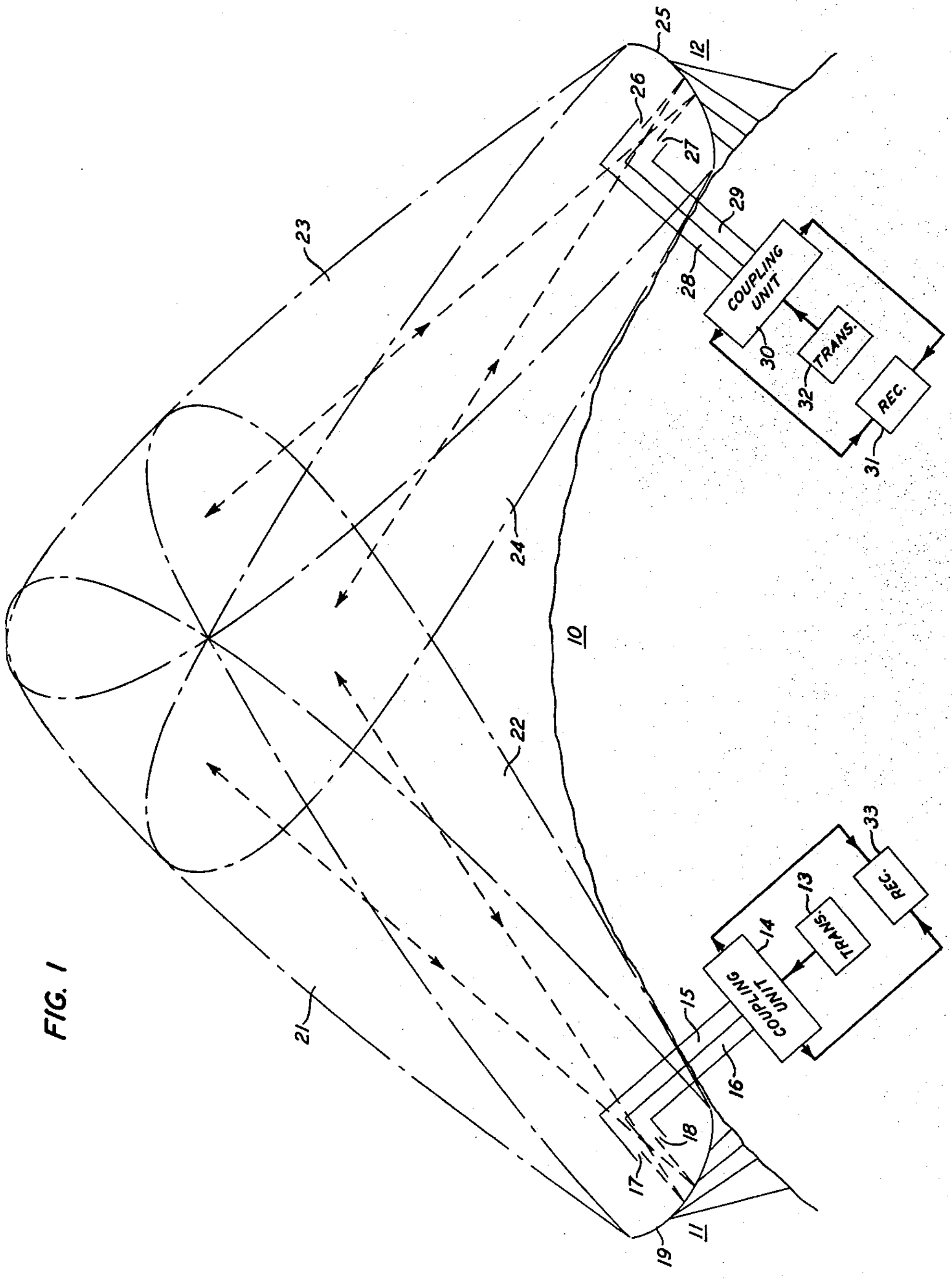
Fig. 1 is a view, partly in vertical cross section and partly in block form, of a principal embodiment of a single antenna multiple lobe diversity system.

Referring more particularly to Fig. 1, there is shown by way of example, in exaggerated form, a two-way tropospheric scatter propagation system employing multiple lobe diversity reception. Situated on the surface of the earth 10 and separated by a distance greater than the line of sight are the two terminal stations 11, 12. Stations 11, 12 may simultaneously transmit and receive wave energy or they may operate as a one-way system, depending on the particular requirements of the communication system of which they are a part. For purposes of initial explanation, one-way transmission from station 11 to station 12 will be assumed. In the operation of the system, energy from transmitter 13 is propagated through coupler 14 into parallel waveguides 15, 16. Coupler 14 provides means for directing wave energy travelling in one direction from transmitter 13 into parallel wave paths 15, 16 in a manner precluding the introduction of unequal amounts of phase shift into the separate paths and at the same time to direct wave energy travelling in wave paths 15, 16 in the opposite direction into separate wave paths distinct from one another and connected to diversity receiver 33. In this manner the individual characteristics of the energy in each of the incoming channels are preserved. Waveguides 15, 16 terminate in apertures 17, 18 which may be preceded by flared feed horns, by waveguide sections of constant cross section, or by tapered waveguide sections. Emitted wave energy from apertures 17, 18 impinges upon reflector 19 whence it is directed outward and upward into the atmosphere in diverging solid angles or lobes 21, 22. The relation between the orientation of lobes 21, 22 in the atmosphere and the location of apertures 17, 18 with respect to reflector 19 will become more apparent hereinafter. Energy propagating toward the troposphere is reflected or scattered in a forward direction. The exact physical mechanism by which this forward reflection takes place is not at present fully understood. H. G. Booker and W. E. Gordon in their article "A Theory of Radio Scattering in the Troposphere" appearing in Proceedings of I.R.E., vol. 38, April 1950, p. 401 and F. Villars and V. F. Weisskopf in their paper "Scattering of EM Wave by Turbulent Atmospheric Fluctuations" in the Physical Review, vol. 94, No. 2, April 1954, p. 232, develop scatter theories based on the turbulence of the atmosphere. The present inventor, in collaboration with H. T. Friis and D. C. Hogg, has proposed a theory in which uncorrelated reflections from stratified layers in the troposphere are assumed to be responsible for the power propagated beyond the horizon. The portion of the transmitted energy comprising lobes 21, 22 which is reflected toward station 12 is extremely small. Losses of from 60 to 80 decibels greater than for free space transmission are common. However, this loss is significantly lower than that predicted from earth diffraction effects alone. The energy scattered by the troposphere and travelling toward station 12 may be thought of as associated with antenna lobes 23, 24. Energy incident upon reflector 25 is reflected therefrom into apertures 26, 27. As will be more fully understood from further explanation hereinafter, each of receiving lobes 23, 24 is intimately related to apertures 27, 26, respectively. From Fig. 1, it may be seen that the two lobes 23, 24 are divergent in space and thus, in effect, are monitoring or "looking at" portions of the atmosphere of different refractive characteristics. It has been established that the fading characteristics of the wave energy contained in lobes 23, 24 are uncorrelated. In order to utilize this phenomenon of non-correlation to advantage, the received energy is guided in separate wave paths 28, 29 into coupler 30, which functions similarly to coupler 14 described above, and thence by separate channels into diversity receiver 31. Diversity receiver 31 is an electronic monitoring system which operates upon the energy received via wave paths 28, 29 and provides without amplification a resultant output signal with an average amplitude distribution higher than either of the Rayleigh distributed input signals. Receiver 31 may be of the receiver switching type, the signal combination type, or of any other diversity receiver types known in the art. The basic techniques to be followed in the design of receiver 31 may be found in an article entitled "Diversity Reception in UHF Long-Range Communications" by C. L. Mack appearing at p. 1281 in the abovementioned October 1955 Proceedings of the I.R.E.

For transmission in the opposite direction, that is, transmitting from station 12 and receiving at station 11, energy from transmitter 32 passes through coupler 30 into waveguides 28, 29 and thence from apertures 26, 27 onto reflector 25 from which it is reflected into the troposphere in lobes 23, 24 and is scattered in a forward direction. A portion of the energy in lobes 23, 24 is reflected by the troposphere and is directed downward into lobes 21, 22 associated with apertures 17, 18 facing reflector 19. The uncorrelated received energy propagates in separate channels 15, 16 into coupler 14 and thence is coupled into dual paths leading to diversity receiver 33.

As stated hereinbefore, prior to the disclosure in the copending application of H. T. Friis referred to above, advantages of diversity reception were thought to be best attainable in scatter propagation systems through the use of two spaced antennas. It was suggested that they be situated on a line perpendicular to the direction of propagation and separated by a minimum of 25 wavelengths of the energy being received. Distances considerably greater than 25 wavelengths were recommended for best results. As a recent example of such teaching, see p. 1278 of vol. 43, Proceedings of I.R.E., mentioned above. However, by a realization of the fact that the fast fading characteristics of tropospherically scattered wave energy received at different locations on the face of a single highly directive wave energy reflector are uncorrelated, it was appreciated that there is no necessity for duplication of the antenna structures. It is necessary only to provide multiple wave energy emitting and collecting means in the vicinity of the focal point of the reflector.

Figure 2:
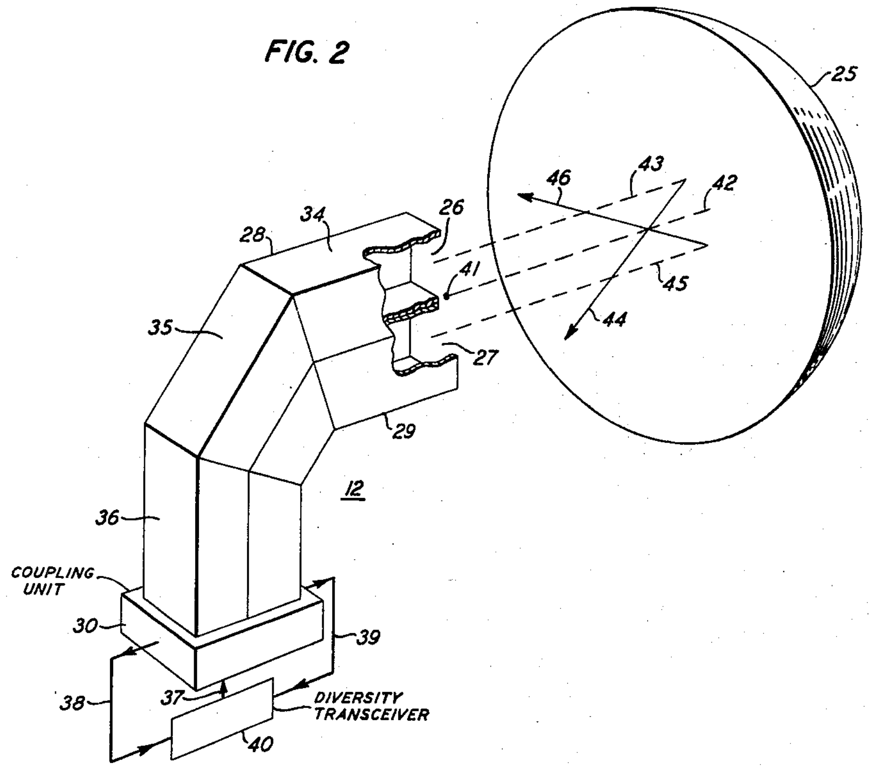
Fig. 2 is a perspective view, partly broken away, of one transmission terminal in a scatter propagation system illustrating the multiple lobe concept.

Fig. 2 is a more detailed view of an example of an antenna station embodying the principles of multiple lobe diversity. For purposes of discussion, it may be assumed that Fig. 2 represents station 12 of Fig. 1 with corresponding reference numerals for corresponding component parts carried over. In practice the illustrated reflector would be considerably larger with respect to the waveguide feed device than is indicated in the figure. In Fig. 2 is shown feed device 34 which is composed of conductive waveguides 28, 29 terminating in apertures 26, 27. Waveguides 28, 29 may be square or round if dual wave energy polarizations are to be used or they may be of the dominant mode rectangular type having a wide internal dimension greater than one-half wavelength and less than one wavelength of the energy to be conducted thereby and a narrow dimension substantially one-half of the wide dimension. As illustrated in Fig. 2, feed device 34 may be preceded by a 90-degree bend section 35 which in turn is connected through straight guide section 36 to coupling device 30 which will be more specifically described hereinafter.

As stated hereinabove, coupler 30 provides means for directing wave energy from a transmitter into two identical paths for transmission purposes and for directing uncorrelated wave energy received at the terminal station and arriving in dual channels from feed device 34 into separate waveguiding paths connected to a diversity receiver. Connected to coupling device 30 through transmitting path 37 and receiving paths 38, 39 is diversity transceiver 40. Diversity transceiver 40 is not limited to the type utilizing the same tubes for transmission and reception and may comprise a transmitter and a diversity receiver operative independently or it may comprise a single simultaneously functioning unit.

Facing apertures 26, 27 is parabolic reflector 25. The reflector is illustrated in Fig. 2 as a concave paraboloidal mirror but it may be of any geometrical shape characterized by high directivity and adapted to long distance wave transmission systems. Reflector 25 may be a cylindrical parabolic reflector or a sectorial parabolic reflector, for example. The focal point of reflector 25 is designated in Fig. 2 as point 41. In accordance with one embodiment of the principles of multiple lobe diversity systems, apertures 26, 27 of feed device 34 are disposed in a symmetrical fashion about focal point 41. As is well known, energy propagating from a point source located at focal point 41 would be reflected from reflector 25 as a major lobe centered about longitudinal axis 42. Since the apertuers 26, 27 are displaced from focal point 41, each aperture may be thought of as a separate point source of wave energy. Thus, emitted energy from upper aperture 26 propagates along longitudinal axis 43 toward reflector 25 and is reflected therefrom at an acute angle to longitudinal axis 42 in a major lobe whose maximum intensity is downwardly displaced from axis 42 and is represented by vector 44. Similarly, emitted energy from lower aperture 27 propagates along longitudinal axis 45 toward reflector 25 and is reflected therefrom at an acute angle to longitudinal axis 42 in a major lobe whose maximum intensity is upwardly displaced from axis 42 and is represented by vector 46.

From the preceding discussion it is seen that apertures 26, 27 are intimately related to the dual antenna lobes, represented by vectors 44, 46, respectively, of reflector 25 for the operation of station 12 as a transmitter. This intimacy remains intact for the operation of station 12 as a receiver. That is, wave energy propagating toward reflector 25 substantially parallel but in directional opposition to vector 44 will, upon incidence upon reflector 25, be reflected at an acute angle thereto and directed along longitudinal axis 43 toward and into aperture 26. In a similar manner, scattered wave energy impinging upon reflector 25 in a direction substantially parallel but in directional opposition to vector 46 will, upon its incidence upon reflector 25, be reflected thereby and be directed along longitudinal axis 45 into aperture 27.

Thus it is clear that lobes 23, 24 of terminal 12 of Fig. 1 may be thought of, not only as the volumetric extent of illumination of a distinct portion of the atmosphere for transmission purposes but also as the volumetric extent of the portion of the atmosphere monitored or "looked at" by apertures 27, 26, respectively, of feed device 34 of Fig. 2 for reception purposes. From experimental observation as well as by theoretical derivation, it has been established that the energy reflected from distinct portions of the troposphere by scatter propagation methods is characterized by essentially uncorrelated fast fading characteristics. Since this is the case, and since the receiving lobes related to apertures 26, 27 are distinctly divergent in the troposphere, the energy received by these apertures and separated in channels 28, 29 of feed device 34 will likewise be uncorrelated and a signal strength advantage may be gained by use of diversity techniques.

Figure 3:
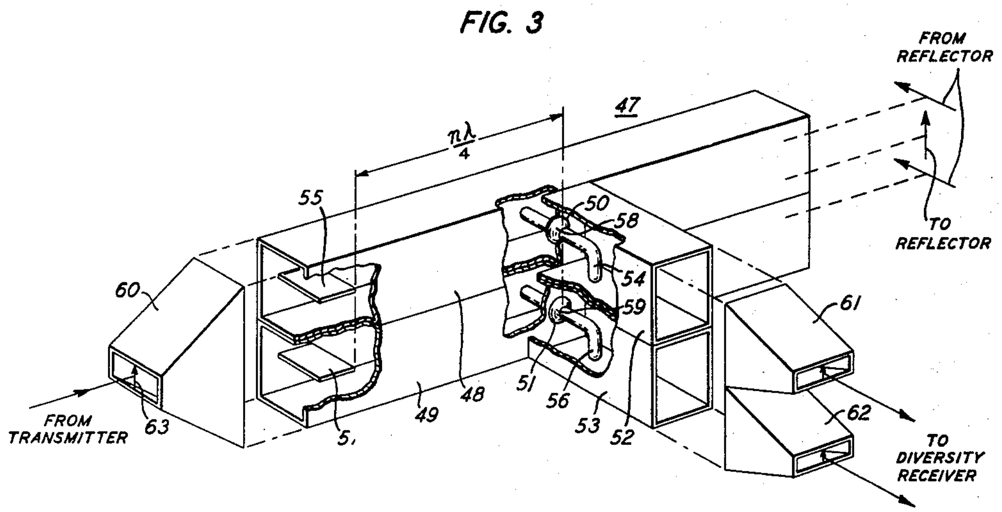
Figs. 3 and 4 are views in perspective, partly broken away, of coupling units in accordance with the invention.

Fig. 3 is a partially broken away perspective view of a particular coupling device embodying the invention. Shown in Fig. 3 is wave energy coupling device 47 comprising in part conductive waveguides 48, 49 arranged in parallel fashion. Waveguides 48, 49 are of square cross section, the length of one side of either guide being less than one wavelength and greater than one-half wavelength of the energy to be guided. Disposed in the center line of one sidewall of each of said guides 48, 49 are circular apertures 50, 51. The dimensions of apertures 50, 51 are small enough to be below cutoff for the wave energy propagating in guides 48, 49. Thus energy is not radiated from these apertures. Centered about apertures 50, 51 with their transverse ends abutting and connected to guides 48, 49 are conductive waveguides 52, 53, respectively. Guides 52, 53 are also of square cross section and have cross sectional dimensions identical to those of guides 48, 49. With all the wave guiding paths of coupler 47 of equal dimension, energy of dual polarizations may propagate in all guides. This property of the guiding paths is closely allied with the feature of interchangeability mentioned above and its importance will become more apparent hereinafter.

Located partially in each guide of waveguide pair 48, 52 is a polarization selective energy coupling device. Similarly located with respect to waveguide pair 49, 53 is a second polarization selective energy coupling device. Each of these couplers comprises two component parts—a coupling probe and a reflecting septum. In waveguide pair 48, 52 the coupling device is composed of probe 54 and septum 55; in pair 49, 53, of probe 56 and septum 57. Probes 54, 56 extend through apertures 50, 51, respectively, and are insulated from conductive contact with the waveguide walls through which they pass by insulating grommets 58, 59. For impedance matching purposes, the probe extremities should not contact the conductive waveguide walls. That portion of probes 54, 56 which extends into guides 48, 49 is substantially linear whereas that portion extending into guides 52, 53 comprises a 90-degree bend in order that propagating wave energy fields may be initiated therein with the electric field vector parallel to the probes. This probe orientation permits coupling of wave energy propagating in parallel waveguides 48, 49 with parallel polarizations into parallel waveguides 52, 53 with collinearly aligned polarizations. Spaced away from probes 54, 56 in guides 48, 49 at an odd number of quarter wavelengths and extending in parallel fashion with respect to said probes are conductive septa 55, 57. Conductive septa 55, 57 bisect the cross section of waveguides 48, 49 and serve the dual purposes of (1) a polarization selector which permits wave energy of only one polarization to propagate at the left end of said guides and thereby precludes intermixing of the wave signals in the guides and (2) a reflecting termination. The septa extend into the waveguides a sufficient distance to introduce at least 30 decibels attenuation to propagating wave energy entering the vicinity of the septa.

Shown spaced away from coupler 47 are wave transducers 60, 61, 62. By means of dashed connecting lines, the physical association of these transducers with coupler 47 is indicated. Transducer 60 is a conducer taper from a cross section of dominant mode rectangular waveguide to a cross section equal to that of the terminal apertures of waveguides 48, 49 taken together. Transducers 61, 62 are conductive tapers from a cross section of dominant mode rectangular waveguide to a cross section equal to that of the terminal aperture of either of waveguides 52, 53 taken separately. The taper may be linear as illustrated, or it may itself be curved.

In the operation of the device of Fig. 3, propagating waves from a transmitter enter transducer 60 polarized in a vertical direction as indicated by vector 63. This energy splits into dual equiphase portions upon entering waveguides 48, 49 and propagates therethrough unaffected by horizontal septa 55, 57, or horizontal probes 54, 56. Still polarized vertically, this energy passes to the wave energy reflector discussed hereinabove in conjunction with Figs. 1 and 2 for direction into the atmosphere. Dual incoming wave energy beams polarized orthogonally to the transmitted energy and uncorrelated by virtue of their random scattering by the troposphere enter waveguides 48, 49, propagate therein in a parallel fashion from the right, and are coupled by the probe-septum combinations above described into waveguide pair 52, 53. A 90-degree space rotation of the plane of polarization occurs during coupling which collinearly aligns the wave energy polarizations in waveguides 52, 53. The individual identity of each of the received beams is preserved as each passes from coupler 47 via guides 52, 53 into dual transducers 61, 62 and thence in separate channels to a diversity receiver.

It should be noted that the over-all function of the device of Fig. 3 is to transmit a single correlated energy beam poralized in a vertical direction from a transmitter and to receive and to direct to a diversity receiver wave energy in dual uncorrelated beams polarized in a horizontal plane. It is thus obvious that, at the companion terminal of the scatter propagation system of which the terminal utilizing the device of Fig. 3 is a part, these functions are reversed. That is, energy in dual uncorrelated beams polarized in the vertical plane is to be received and directed in separate channels to a diversity receiver while a single correlated energy beam polarized in the horizontal plane is to be transmitted. It is at this junction that the feature of interchangeability of the invention assumes its prominence.

Figure 4:
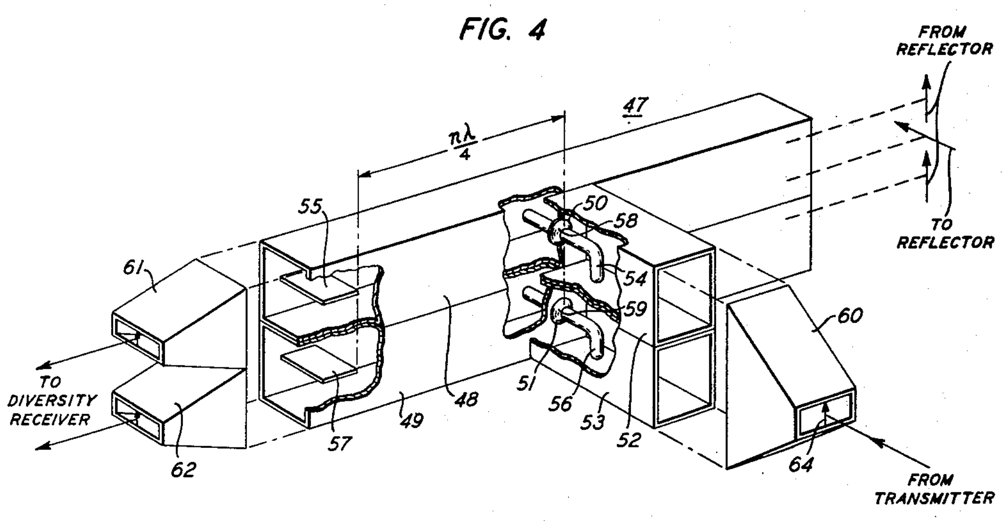

Fig. 4 is an illustration of a coupling device in accordance with the invention which provides the requisite coupling function for the companion terminal referred to above while retaining completely the basic coupler unit 47 of Fig. 3. As may be easily seen, the only difference between Figs. 3 and 4 is the interchanged locations between transducer 60 and transducers 61, 62. The structure of the basic coupling unit remains the same; the transducer structures remain the same; only their interconnection is varied.

The description of the structure of Fig. 4 is identical with that given above with respect to Fig. 3 and, it will be noted, reference numerals identical to those of Fig. 3 have been assigned to the various component parts of Fig. 4.

Explaining briefly the operation of the coupling device of Fig. 4, incoming wave energy, polarized in a vertical direction in dual uncorrelated beams passes into waveguides 48, 49 and propagates directly therethrough, unaffected by horizontal probes 54, 56 and horizontal septa 55, 57, and thence through transducers 61, 62 to a diversity receiver. For transmission, wave energy from a transmitter enters transducer 60, polarized in the vertical direction as indicated by vector 64. This energy splits into dual equiphase portions upon entering waveguides 52, 53 and is coupled by probes 54, 56, a 90-degree space rotation of the plane of polarization being effected thereby, into waveguides 48, 49. By virtue of the conductive septa 55, 57, the propagation path to the left of the probes is below cutoff and thus the energy propagates to the right and, still polarized in a horizontal direction, passes onto the reflector for direction into the atmosphere.

The feature of the invention which allows interchangeability of the basic coupling unit among terminal stations of multiple lobe diversity systems may be utilized in yet another manner. From the functional description given above, it is seen that the direction of polarization of the transmitted and received wave energy at any terminal may be interchanged merely by interchanging the location of transducer 60 with that of transducers 61, 62 in the same manner as would be done in adapting a pair of couplers 47 for use at the two terminals of a scatter propagation system.

Figure 5:
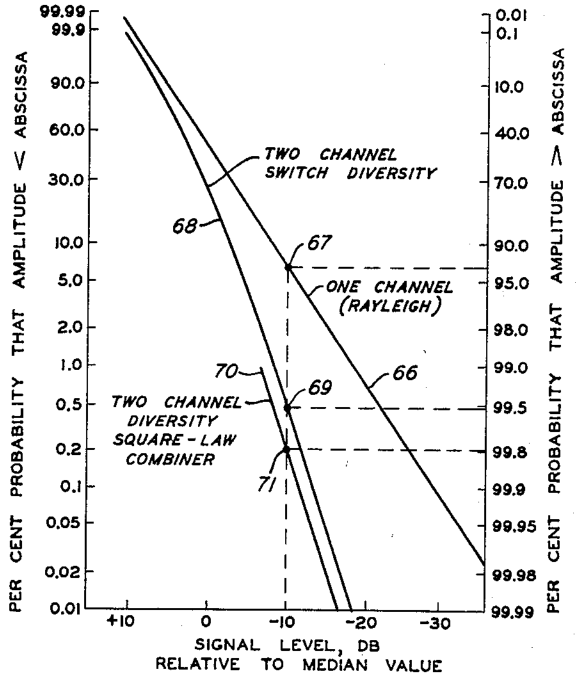
Fig. 5, given by way of explanation, is a graph illustrating the theoretical advantage afforded by a diversity system.

Fig. 5 is given by way of illustration to demonstrate the reduction in fast fading characteristics possible through the use of diversity reception techniques. Curve 66 describes the usual Rayleigh distributed signal received by a single channel tropospheric scatter propagation circuit. From curve 66 it may be seen that for 94 percent of the time the signal will be stronger than 10 decibels below its median value. This is illustrated as point 67 on the graph. Performance may be improved through the introduction of diversity principles into the receiver.

ducted thereby, said transversely extending parts of said probes being colinear to couple wave energy having colinearly aligned polarizations in the guides of said second waveguide pair, at least three waveguide transducers connected to said pairs of open terminal ends thereby reducing the six terminal ends to five connecting apertures, a transmitter connected to a first of said connecting apertures, a diversity receiver connected to second and third of said apertures, and a substantially identical pair of wave guiding paths having one end thereof connected to fourth and fifth of said apertures, the other ends of said paths terminating in adjacent apertures facing a concave reflector.

7. An electromagnetic wave energy coupling circuit for single antenna multiple lobe diversity systems comprising a first pair of conductively bounded waveguides each capable of supporting a pair of orthogonal polarizations of said wave energy, said guides being arranged in parallel relationship so that one of said polarizations in one guide is parallel to a polarization in the other guide and the other polarization in one guide is collinearly aligned with a polarization in the other guide, a second pair of conductively bounded waveguides having the same transverse dimensions as said first pair of guides, means for coupling said parallel polarizations in said first pair of guides respectively with aligned polarizations of wave energy in said second pair of guides, and means for coupling between aligned polarizations of wave energy in one of said pairs of guides and a single polarization in another guide connected to one of the ends of said one pair of guides.

8. In combination, a parabolic reflector having a focal point, a pair of waveguide apertures spaced about said focal point facing said reflector, said apertures being adapted to transmit electromagnetic wave energy at a given carrier frequency and with a polarization $p_1$, said apertures further adapted to receive electromagnetic wave energy at a given carrier frequency and with a polarization $p_2$ orthogonal to $p_1$, a transmitter connected to said apertures through a coupling circuit, and a diversity receiver also connected to said apertures through said coupling circuit, said coupling circuit comprising a first pair of conductively bounded waveguides each capable of supporting polarizations $p_1$ and $p_2$, said guides being arranged in parallel fashion so that one of said polarizations in one guide is parallel to a polarization in the other guide and the other polarization in one guide is collinearly aligned with a polarization in the other guide, a second pair of conductively bounded waveguides having the same transverse dimensions as said first pair of guides, means for coupling said parallel polarizations in said first pair of guides respectively with aligned polarizations of said wave energy in said second pair of guides, and means for coupling between aligned polarizations of wave energy in one of said pairs of guides and a single polarization in an external connecting guide.

References Cited in the file of this patent

UNITED STATES PATENTS

| | | |
|---|---|---|
| 2,585,173 | Riblet | Feb. 12, 1952 |
| 2,812,500 | Riblet | Nov. 5, 1957 |
| 2,818,549 | Adcock et al. | Dec. 31, 1957 |

Curve 68 represents the distribution of the signal produced by a two-channel receiver of the switch diversity type. Switch diversity systems utilize the stronger of the incoming signals at any given instant while discarding entirely the weaker. As illustrated by point 69, in two-channel switch diversity the received signal will be stronger than 10 decibels below its median value for 99.6 percent of the time. By utilizing a two-channel combinational type diversity—one in which neither signal is totally discarded—the quality of performance may be increased still more. Curve 70 depicts the theoretical curve for such a combinational type receiver. The general principle of a square law combination type receiver is presented in a note "Ratio Squarer" by Mr. L. R. Kahn, appearing in Proceedings of the I.R.E., vol. 42, November 1954, at p. 1704. As depicted by point 71 the received signal with such a system will be stronger than 10 decibels below its median value for more than 99.8 percent of the time.

A major prerequisite for the reception of multiple uncorrelated energy beams is a sharply directive antenna. Sharpness of directivity varies in direct proportion to antenna diameter. Thus, a large antenna diameter is a prerequisite to the proper operation of a multiple lobe diversity system. Experiments have shown that a parabolic antenna having a diameter of 60 feet is well-suited to multiple feed over-the-horizon diversity propagation at 4000 mc.

Numerous modifications of the multiple lobe diversity system with which the above-disclosed coupling unit may be a part may be devised. For some applications, a horizontal displacement of the feed apertures about the focal point of the reflector has been found more attractive than the vertically displaced apertures as disclosed in Fig. 1 hereinabove. For this application the operation of the coupling units is identical to that described. A modification of the vertically displaced aperture embodiment is also attractive for certain applications. The modification consists of transmitting energy from one aperture only of a plurality of apertures spaced in the vicinity of the focal point of the reflector. The aperture from which energy is transmitted may be positioned at the focal point itself. Energy is received at all apertures as previously in order to obtain the multiple lobe diversity advantage. The coupling units described herein may be easily modified to operate with the modified vertical aperture diversity system. The basic couplers 47 of Figs. 3 and 4 are not changed. The only modification necessary is to substitute a transducer similar to transducer 62 for transducer 60. Thus all transducers are identical. In this manner energy from the transmitter will be propagated in one channel only while received uncorrelated energy will be propagated in dual channels as before.

In all cases, it is understood that the above-described arrangements are illustrative of a small number of the many specific embodiments which can represent applications of the principles of this invention. Numerous and varied other arrangements can readily be devised in accordance with these principles by those skilled in the art without departing from the spirit and scope of the invention.

What is claimed is:

1. An electromagnetic wave energy coupling circuit comprising a first coextensive pair of conductively bounded waveguides capable of supporting a plurality of polarizations of said energy and having first and second pairs of open terminal ends with a given transverse cross section, a second coextensive pair of conductively bounded waveguides capable of supporting a plurality of wave energy polarizations perpendicularly intersecting said first pair between said terminal ends and having a third pair of open terminal ends with said given transverse cross section, polarization selective coupling means comprising a conductive probe with a portion thereof extending transverse to the direction of propagation of wave energy in each waveguide of said first waveguide pair and a portion thereof extending parallel in part and transverse in part to the direction of propagation of wave energy in each waveguide of said second waveguide pair in combination with a conductive septum extending into each of the waveguides of said first waveguide pair at said first terminal end in a direction parallel to the portion of said probe extending therein and spaced away therefrom an odd number of quarter wavelengths of the energy to be conducted thereby, said transversely extending parts of said probes being colinear to couple wave energy having colinearly aligned polarizations in the guides of said second waveguide pair, and at least three waveguide transducers connected to said pairs of open terminal ends.

2. An electromagnetic wave energy coupling circuit for single antenna multiple lobe diversity systems comprising a first coextensive pair of conductively bounded waveguides capable of supporting a plurality of polarizations of said energy and having first and second open terminal ends with a given transverse cross section, a second coextensive pair of conductively bounded waveguides perpendicularly intersecting said first pair between said terminal ends and having a third open terminal end with said given transverse cross section, wave energy coupling means between said pairs including a conductive probe with a portion thereof extending in each of the waveguides of said second pair in colinear alignment and a conductive septum extending into each of the waveguides of said first pair at said first terminal end but spaced away from the location of said probe an odd number of quarter wavelengths of the energy to be guided therein, and waveguide transducers connected to each of said open terminal ends.

3. Apparatus according to claim 2 in which the transducer connected to said first terminal end is a conductively bounded taper from dominant mode rectangular waveguide to double width square waveguide and the transducer connected to said third terminal end is a pair of conductively bounded tapers from dominant mode rectangular waveguide to square waveguide.

4. Apparatus according to claim 2 in which the transducer connected to said third terminal end is a conductively bounded taper from dominant mode rectangular waveguide to double width square waveguide and the transducer connected to first said terminal end is a pair of conductively bounded tapers from dominant mode rectangular waveguide to square waveguide.

5. Apparatus according to claim 2 in which all transducers are conductively bounded tapers from dominant mode rectangular waveguide to square waveguide.

6. In combination, a microwave energy coupling device comprising a first coextensive pair of conductively bounded waveguides capable of supporting a plurality of polarizations of said energy and having first and second pairs of open terminal ends with a given transverse cross section, a second coextensive pair of conductively bounded waveguides capable of supporting a plurality of wave energy polarizations perpendicularly intersecting said first pair between said terminal ends and having a third pair of open terminal ends with said given transverse cross section, polarization selective coupling means comprising a conductive probe with a portion thereof extending transverse to the direction of propagation of wave energy in each waveguide of said first waveguide pair and a portion thereof extending parallel in part and transverse in part to the direction of propagation of wave energy in each waveguide of said second waveguide pair in combination with a conductive septum extending into each of the waveguides of said first waveguide pair at said first terminal ends in a direction parallel to the portion of said probe extending therein and spaced away therefrom an odd number of quarter wavelengths of the energy to be con-